(12) United States Patent
Pelegero et al.

(10) Patent No.: US 8,214,291 B2
(45) Date of Patent: Jul. 3, 2012

(54) UNIFIED IDENTITY VERIFICATION

(75) Inventors: Rene M. Pelegero, Woodinville, WA (US); Girish Balasubramanian, San Jose, CA (US); Rohan Mahadevan, Menlo Park, CA (US)

(73) Assignee: eBay Inc., San Jose, CA (US)

( * ) Notice: Subject to any disclaimer, the term of this patent is extended or adjusted under 35 U.S.C. 154(b) by 179 days.

(21) Appl. No.: 11/962,757

(22) Filed: Dec. 21, 2007

(65) Prior Publication Data
US 2009/0106150 A1 Apr. 23, 2009

Related U.S. Application Data

(60) Provisional application No. 60/981,408, filed on Oct. 19, 2007.

(51) Int. Cl.
*G06Q 40/00* (2006.01)
(52) U.S. Cl. ......................................................... 705/44
(58) Field of Classification Search .................... 705/44; 726/9
See application file for complete search history.

(56) References Cited

U.S. PATENT DOCUMENTS

| | | | | |
|---|---|---|---|---|
| 5,661,803 A | * | 8/1997 | Cordery et al. | 705/60 |
| 5,812,666 A | * | 9/1998 | Baker et al. | 380/277 |
| 5,943,423 A | * | 8/1999 | Muftic | 705/67 |
| 6,385,596 B1 | * | 5/2002 | Wiser et al. | 705/51 |
| 6,868,403 B1 | * | 3/2005 | Wiser et al. | 705/51 |
| 6,970,853 B2 | * | 11/2005 | Schutzer | 705/67 |
| 7,017,188 B1 | * | 3/2006 | Schmeidler et al. | 726/26 |
| 7,369,999 B2 | * | 5/2008 | DuBois et al. | 705/1 |
| 2003/0061170 A1 | | 3/2003 | Uzo | |
| 2003/0061203 A1 | | 3/2003 | Hayduk | |
| 2005/0065881 A1 | | 3/2005 | Li et al. | |
| 2005/0119978 A1 | | 6/2005 | Ates | |
| 2005/0131752 A1 | * | 6/2005 | Gracie et al. | 705/10 |
| 2006/0074765 A1 | * | 4/2006 | Crawford et al. | 705/26 |
| 2006/0204051 A1 | * | 9/2006 | Holland, IV | 382/115 |
| 2008/0072293 A1 | * | 3/2008 | D'Urso | 726/4 |
| 2008/0162295 A1 | * | 7/2008 | Bedier | 705/26 |
| 2008/0228653 A1 | | 9/2008 | Holdsworth | |
| 2010/0145860 A1 | | 6/2010 | Pelegero | |

FOREIGN PATENT DOCUMENTS

WO WO-2010078522 A1 7/2010

OTHER PUBLICATIONS

U.S. Appl. No. 12/347,907, Non-Final Office Action mailed Oct. 28, 2009, 3 pgs.

(Continued)

*Primary Examiner* — Lindsay M. Maguire
(74) *Attorney, Agent, or Firm* — Schwegman, Lundberg & Woessner, P.A.

(57) ABSTRACT

Apparatus, systems, and methods are disclosed that operate to register one time, at a financial entity, information comprising an identity uniquely associated with an individual having a financial account held by the financial entity. Additional actions include receiving a request at the financial entity from a requesting party to authenticate a customer purporting to be the individual, authenticating, by the financial entity, the customer as the individual by matching a token presented by the customer to the identity uniquely associated with the individual, and providing to the requesting party a previously-authorized portion of a profile associated with the individual. Additional apparatus, systems, and methods are disclosed.

34 Claims, 8 Drawing Sheets

OTHER PUBLICATIONS

"Card HQ, Online Resources", http://www.orcc.com/products/ebanking/banking/cardhq.asp, Online Resources Corporation, (2008).

"Security Assertion Markup Language", http://en.wikipedia.org/wiki/Saml, From Wikipedia, the free encyclopedia, (Sep. 26, 2008).

"Why NYCE Plans to Test Two Online PIN Debit Systems in Parallel", http://www.digitaltransactions.net/newsstory.cfm?newsid=1995, Digital Transactions, (Dec. 3, 2008).

U.S. Appl. No. 12/347,907, Response filed Jan. 28, 2010 to Non Final Office Action mailed Oct. 28, 2009, 13 pgs.

International Application Serial No. PCT/US2009/069963, Written Opinion mailed Mar. 4, 2010, 4 pgs.

International Application Serial No. PCT/US2009/069963, International Search Report mailed Mar. 4, 2010, 4 pgs.

"U.S. Appl. No. 12/347,907, Final Office Action mailed Jan. 26, 2011", 10 pgs.

"U.S. Appl. No. 12/347,907, Non-Final Office Action mailed Jul. 13, 2010", 10 pgs.

"U.S. Appl. No. 12/347,907, Response Filed Mar. 31, 2011 to Final Office Action Received Jan. 26, 2011", 10 pgs.

"U.S. Appl. No. 12/347,907, Response filed Dec. 13, 2010 to Non-Final Office Action mailed Jul. 13, 2010", 10 pgs.

"International Application Serial No. PCT/US2009/069963, International Preliminary Report on Patentability mailed Jul. 14, 2011", 6 pgs.

\* cited by examiner

UNIFIED IDENTITY VERIFICATION

PRIORITY CLAIMS

This disclosure claims the benefit of the filing date of U.S. Provisional Patent Application Ser. No. 60/981,408, filed on Oct. 19, 2007, and titled "Unified Identity Verification." It is commonly assigned to the assignee of the instant application, eBay, Inc., and is incorporated herein by reference in its entirety.

BACKGROUND

The Internet and the World Wide Web ("Web") have changed the landscape of information delivery and affected numerous faculties of life, including electronic commerce and entertainment. One area that has benefited from this technological development is the ability for individuals to buy and sell products over the Internet. The resulting growth of electronic commerce has encouraged many businesses to join hands in doing business and in sharing customers and their information. The overlapping businesses, partnerships in conducting business, referrals, mutual distribution of resources, and sharing of users and user information has created a network of applications, servers, and Websites which has created various technical challenges, complexities, and insecurities.

BRIEF DESCRIPTION OF THE DRAWINGS

Some embodiments are illustrated by way of example and not limitation in the figures of the accompanying drawings in which.

DETAILED DESCRIPTION

The inventors have discovered that a number of technical challenges exist with respect to authorization and authentication of users and/or systems. For example, conventionally, when a customer attempts to make a purchase from a vendor that has not been previously approached, much sensitive and personal user information, ranging from passwords to profiles, is directly transmitted from the customer to the vendor. The transmission of such data is not only potentially insecure, but cumbersome, in that it may require a separate transmission for each of the secondary systems (i.e., servers) that the customer accesses, even when ultimately accessing the same primary system (e.g., vendor internet system provider). This and other technological challenges tend to limit the performance of system networks, in general, and the ability of the user to access multiple systems, in particular. Finally, it has been discovered by the inventors that many individuals are generally annoyed with having to verify their identity numerous times, even to the extent of providing the same information to entities which are directly related to each other.

To address these challenges and others, a mechanism has been developed so that an individual need register their identity only once, to a single entity, and thereafter, other entities may rely upon authentication by the entity that has registered the individual whenever the identity of the individual is to be verified. This can result in minimal transfer of information by an individual each time verification takes place. In addition, the individual can specify the information that may be released by the authenticating entity to other entities that seek identity verification.

Example System Architecture

Figure 1:
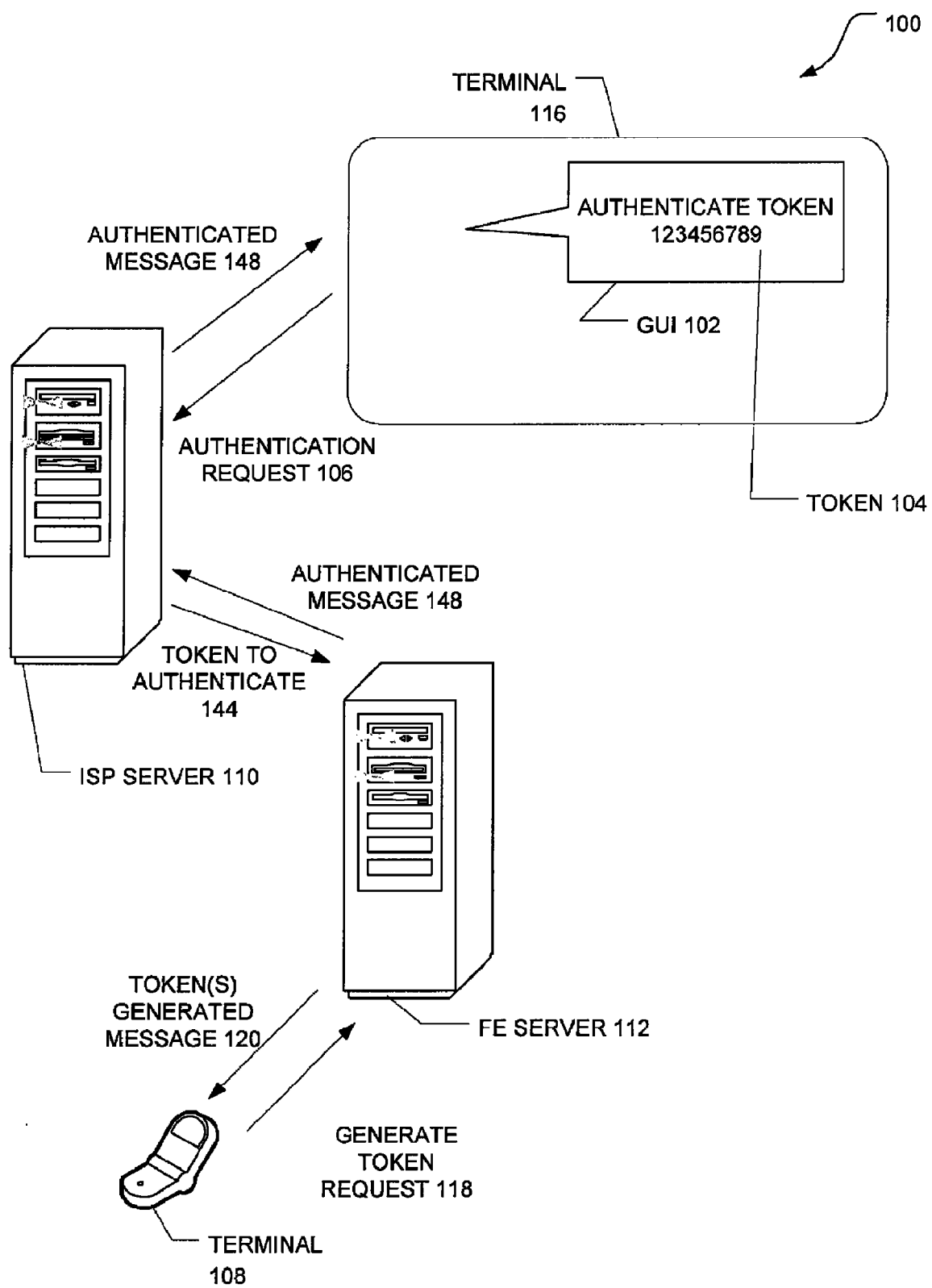
FIG. 1 is a high level diagram illustrating token generation and authentication according to various embodiments of the invention.

FIG. 1 is a high level diagram illustrating token generation and authentication according to various embodiments of the invention. Prior to making a request for authentication, an individual should register once with some authenticating entity, such as a financial entity, so that their identity can later be verified. Once that occurs, the authenticating entity, perhaps represented by a financial entity server 112, can generate authentication tokens on behalf of the individual that has been registered.

For example, an individual may use a client terminal 108, perhaps taking the form of a cellular telephone in some embodiments, to inform the financial entity server 112 that authentication tokens have been requested in a requesting message 118. Upon the entry of selected information (e.g., logging into a bank account owned by the individual with a username and password), the authenticating entity may then generate and issue one or more tokens to the individual. Such tokens may take the form of one or more smart cards, a magnetic card, a radio frequency identification (RFID) device, a bar code, or a printed piece of paper. Thus, tokens may be physically generated, or electronically generated, perhaps in the form of an email message 120 to the terminal 108.

Once the tokens have been generated, they may be presented at a number of locations for authentication. In this manner, the individual need only register one time with an authenticating entity, and thereafter, authentication may be accomplished using tokens, so that little or no information is passed on to various other entities (e.g., an unknown vendor) for inspection prior to various transactions taking place.

Here it can be seen that a system 100 for token generation and authentication may receive a token 104, and a request 106 to authenticate the token 104, perhaps at an internet service provider (ISP) server 110 representing a vendor or other party requesting authentication of the token 104. The request for authentication of the token 104 may be entered using a client terminal 116 with a graphical user interface (GUI) 102. One example of such a request might be initiated by scanning a smart card having an embedded RFID device with the token recorded thereon. Another might be scanning a bar code, either as presented by a customer on a printed piece of paper, or perhaps, as displayed on a cellular telephone.

Responsive to receiving the request, the ISP server 110 may forward the token 104 as part of a message 144 to a financial entity server 112. The financial entity server 112 may represent the financial entity or other entity that has registered the identity of the individual seeking authentication by the vendor (represented by the ISP server 110). If the token is matched by the financial entity server, then a message 148 announcing that authentication was successful may be returned to the ISP server 110 from the financial entity server 112, and thereafter, to the client terminal 116.

Figure 2:
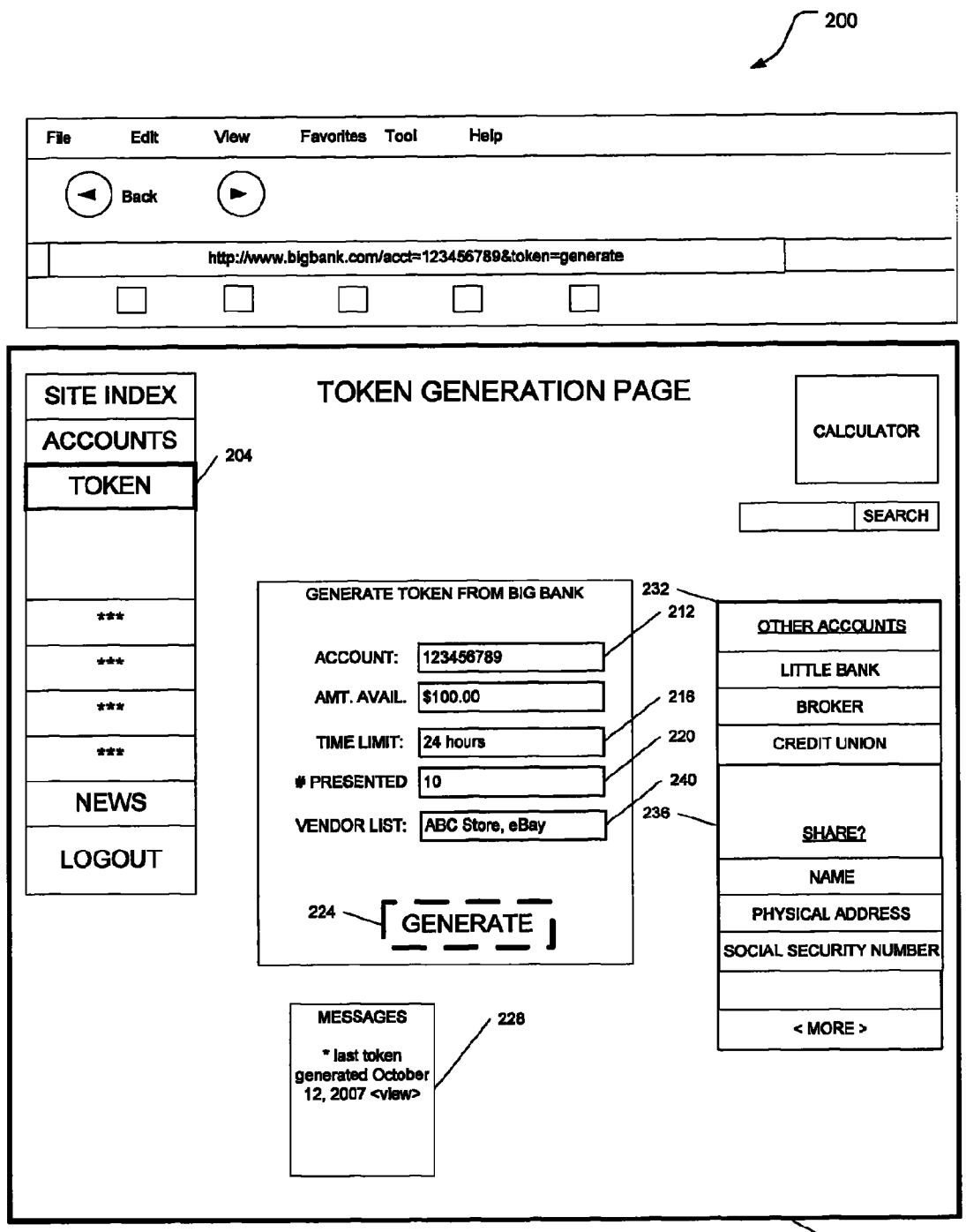
FIG. 2 is a simplified diagram illustrating an example graphical user interface according to various embodiments of the invention.

FIG. 2 is a simplified diagram illustrating an example graphical user interface 200 according to various embodiments of the invention This interface 200 is one of many that are possible. In the particular example of FIG. 2, a sample web page that might be seen by an individual that has logged into his bank account on the Internet is shown. Here, the "TOKEN" option 204 has been selected, calling up the TOKEN GENERATION PAGE 208. This selection permits the individual account owner to select a particular account 212 that can be used to generate tokens. Here it can be seen that several fields, such as a time limit field 216, a number presented field 220, and a vendor list field 240 may be populated with various information.

For example, after an individual selects an account 212 to be used in conjunction with token generation, perhaps from a number of accounts in an account field 232, a time limit for token validity may be set in field 216 (e.g., 24 hours after generation, the token will no longer be valid for authentication purposes). The individual may also select how many times the token may be presented (e.g., 10) using the field 220. Finally, a limited selection of entities that can request authentication may also be selected, using field 240. In this way, the useful lifetime and other breadth of use characteristics for particular tokens may be limited, providing increased security. The individual may also specify information to be shared with requesting parties by the authenticating entity upon successful authentication, perhaps using the sharing field 236.

Once the limiting selections have been made, the individual account owner might simply click on the GENERATE widget 224 to generate a token. In some embodiments, a message field 228 in the GUI 200 may be used to inform the individual account owner when the last token was generated. Other fields in the GUI 200 may be used to provide additional selection alternatives.

Figure 3:
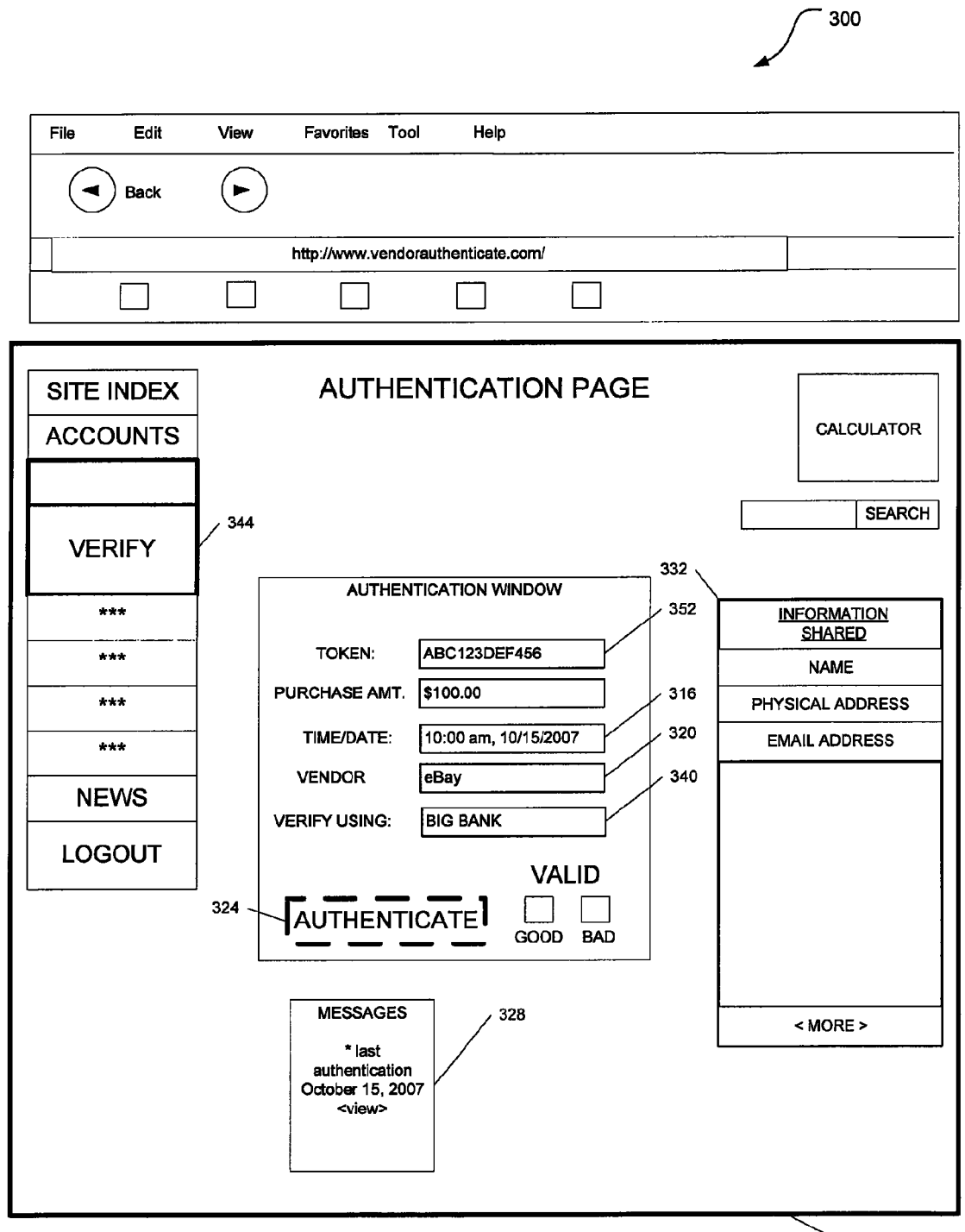
FIG. 3 is a block diagram illustrating another example of a graphical user interface according to various embodiments of the invention.

FIG. 3 is a block diagram illustrating another example of a graphical user interface 300 according to various embodiments of the invention. This interface 300 is one of many that are possible. In the particular example of FIG. 3, a sample web page that might be seen by a vendor that has logged into an authentication entity web page on the Internet is shown. Here, the "VERIFY" option 344 has been selected, calling up the AUTHENTICATION PAGE 348. This selection permits the vendor (e.g., the requesting party) to enter a token into an authentication system by a number of methods, including manually typing in a coded value into the token field 352. Other methods of entry include electrical (e.g., direct contact pads), electronic (e.g., RFID), and optical (e.g., bar code) scanning.

The time and date may be entered into the time/date field 316, and the party making the request may identify themselves in the vendor field 320. The authentication entity may be selected using the verification field 340. For security purposes, any of the fields 352, 316, 320, and 340 may be auto-generated by the authenticating entity.

To authenticate the token, the requesting party might simply click on the AUTHENTICATE widget 324. The validity of the token (and therefore authentication of the identity of the individual, such as a customer of the vendor) may be indicated by simple GO, NO-GO or GOOD/BAD indicators. Upon successful authentication, certain information 332 may be shared with the requesting party. Here, for example, the name, physical address, and the email address of the individual are shared. Other information, obtained at the time of registration or thereafter by the authenticating entity, may also be shared, if requested by the requesting party and permitted by the individual. Such information may be specified as part of the token generation activity (shown in FIG. 2). In some embodiments, a message field 328 in the GUI 300 may be used to inform the requesting party when the last authentication occurred, either with respect to the particular token being authenticated, or perhaps with respect to the vendor requesting authentication.

Figure 4:
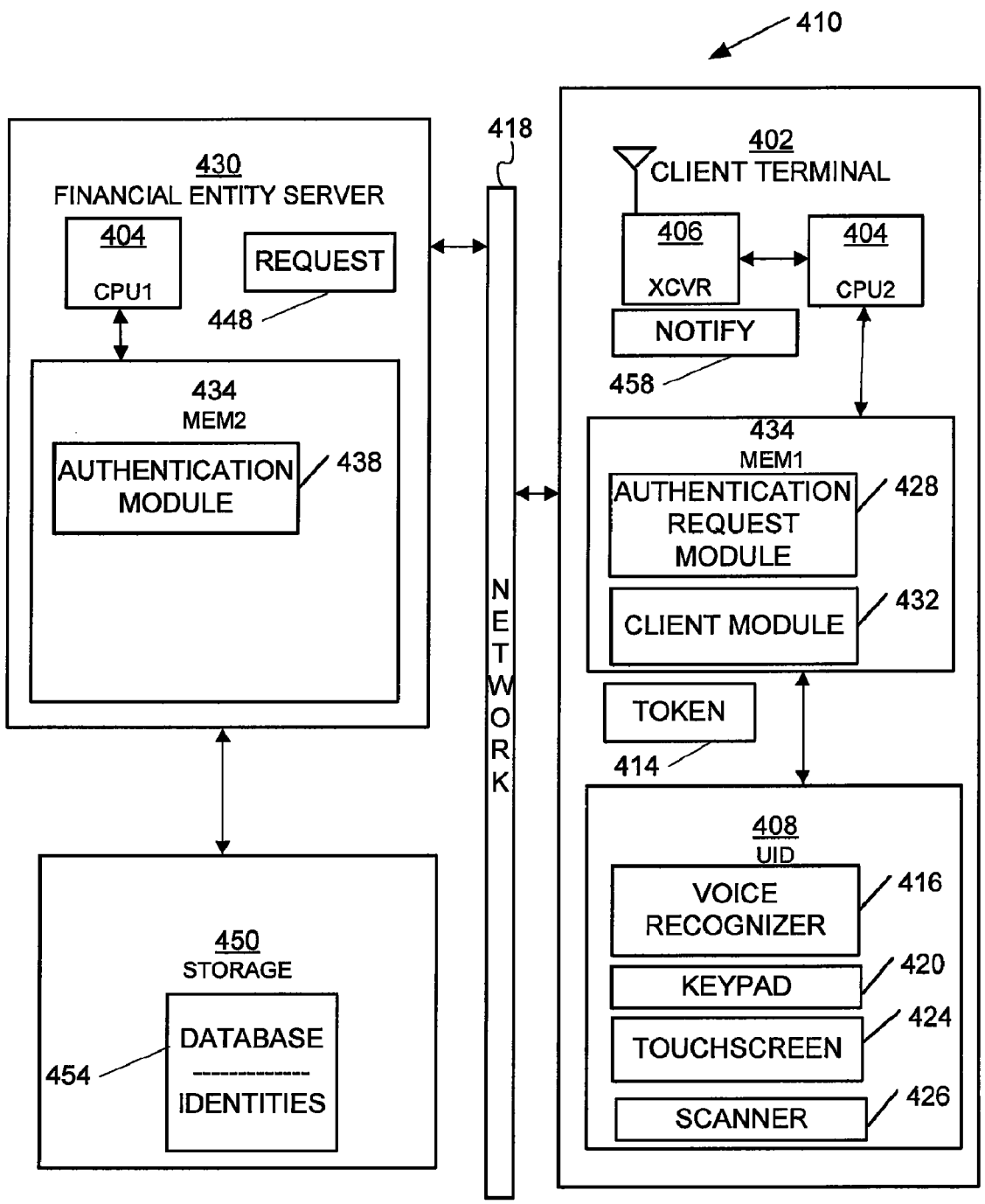
FIG. 4 is a block diagram of apparatus and systems according to various embodiments of the invention.

FIG. 4 is a block diagram of apparatus 402 and systems 410 according to various embodiments of the invention. The apparatus 402 can take many forms, such as an automated teller machine (ATM), a cellular telephone, a desktop computer terminal with Internet access, a point of sale (POS) terminal, etc.

In some embodiments, the apparatus 402 may comprise one or more user input devices 408, such as a voice recognition processor 416, a keypad 420, a touchscreen 424, a scanner 426, a thumbwheel, a button, etc. In some embodiments, a POS terminal may be used to house the user input device 408.

The apparatus 402 may include a client module 432 to communicatively couple to a server (e.g., server 430) at a financial entity. The apparatus 402 may also comprise an authentication request module 428 to receive a token 414 presented by a customer, to transmit a request 448 to the financial entity (e.g., represented by the server 430) to authenticate the customer purporting to be a particular individual, and to receive notification 458, from the financial entity, that the customer is authenticated as the individual based on matching the token 414 to an identity that has been registered with the financial entity and is uniquely associated with the individual.

Other embodiments may be realized. For example, a system 410 may include one or more apparatus 402. The system 410 may also include a server 430 to communicatively couple to a global computer network 418 (e.g., the Internet), and an authentication module 438 to receive a request 448 from a requesting party (e.g., represented by the client terminal 402) to authenticate the customer purporting to be a particular individual. The request 448 may include the token 414.

The authentication module 438 may be used to send notification 458 that the customer is authenticated as the individual based on matching the token 414 to an identity that has been registered with a financial entity and is uniquely associated with the individual. For example, the server 430 may be located within a bank that has many individual account holders, each registered so that identity authentication tokens 414 may be generated on their behalf.

As noted previously, the terminal 402 may comprise a POS terminal associated with the requesting party, wherein the POS terminal is to receive the token 414, and to be communicatively coupled to the server 430. In some embodiments, the system 410 may comprise a storage device 450 to couple to the server 430 and to store a database 454 having a plurality of registered identities IDENTITIES, including the identity of the individual whose identity is being authenticated.

Example Methods

Figure 5:
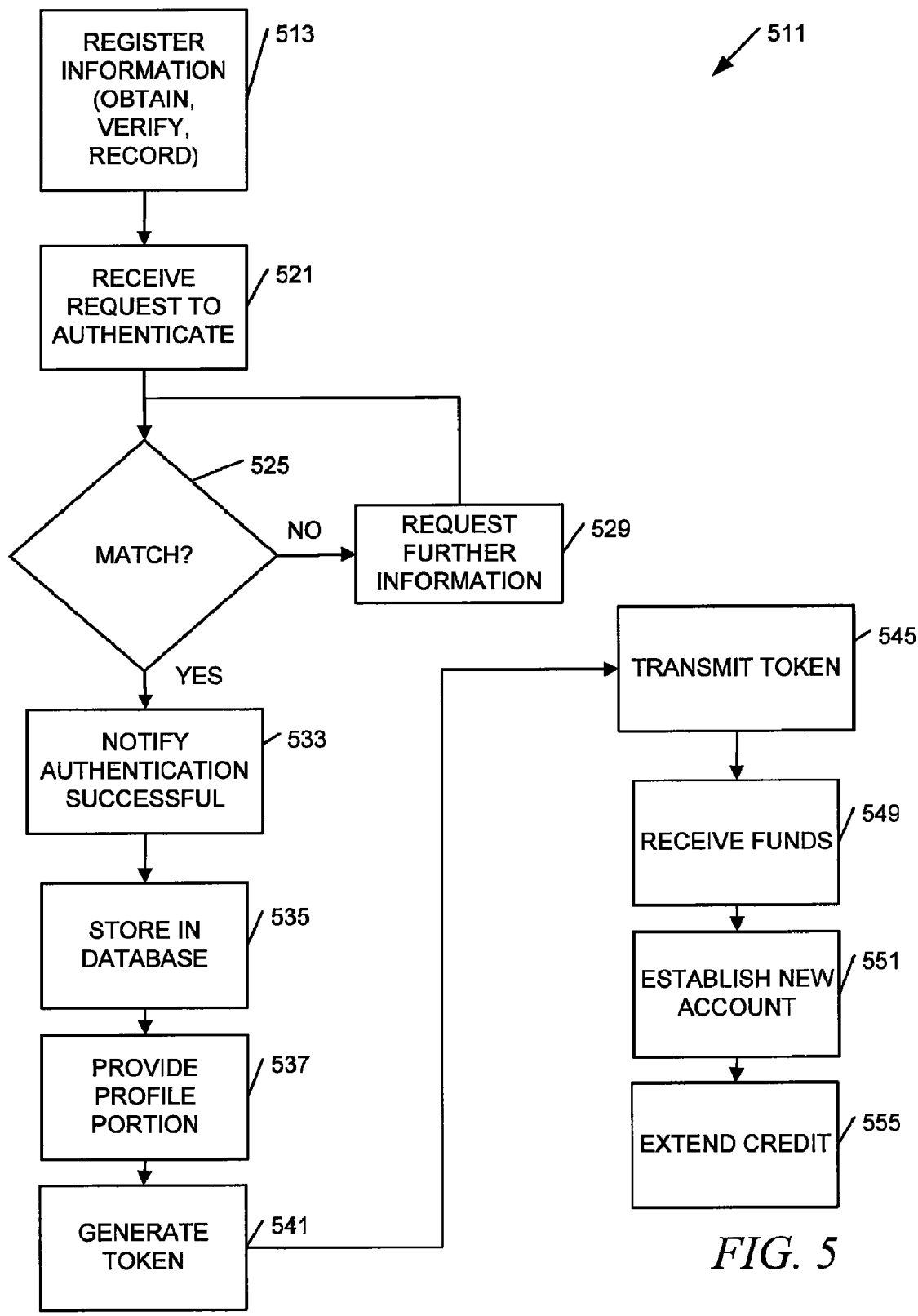
FIG. 5 is a flow diagram illustrating methods according to various embodiments of the invention.

FIG. 5 is a flow diagram illustrating methods 511 according to various embodiments of the invention. For example, a computer-implemented method 511 may begin at block 513 with registering one time, at an authenticating entity, information comprising an identity uniquely associated with an individual having a financial account held by the financial entity.

Registering at block 513 may include obtaining, verifying, and recording the information according to customer identification program (CIP) requirements, Know Your Customer (KYC) requirements, Know Your Business (KYB) requirements, and watch-list scanning requirements. Such requirements are well-known to those of ordinary skill in the art. The information may comprise one or more of the name of the individual, the birth date of the individual, the physical address associated with the individual, and/or an identification number associated with the individual (e.g., social security number, hash-coded identification number, etc.). Registering may also comprise obtaining, verifying, and recording a prior verification associated with the customer by the financial entity against customer identification program (CIP) requirements, Know Your Customer (KYC) requirements, Know Your Business (KYB) requirements and watch-list scanning requirements, for example.

The method 511 may continue on to block 521 with receiving a request at the authenticating entity from a requesting party that has been presented with a token to authenticate a customer purporting to be a particular individual. The requesting party may comprise a vendor, another financial entity, a brokerage, a lender, a car lot, an online auction provider, etc. Receiving the request may include receiving a message from the requesting party at the authenticating entity via a global computer network (e.g., the Internet).

At this point, an attempt is made to match the token presented to the identity of the individual. Thus, the method 511 may include at block 525 authenticating, by the authenticating entity, such as a bank or other financial entity, the customer as the individual by matching a token presented by the customer to the identity uniquely associated with the individual. If no match is determined at block 525, the method 511 may include requesting, if the authenticating is not successful, additional information from the customer at block 529. One or more additional attempts, perhaps limited in number by the authenticating entity, may be made to authenticate the identity of the individual by matching the token with the identity at 525.

If authentication succeeds at block 525, the method 511 may include notifying the requesting party that the customer has been authenticated as the individual by sending a message (e.g., an email message) to the requesting party, perhaps via a global computer network, at block 533. For example, the method 511 may include sending a message to a mobile device associated with the customer that the authenticating has been successful. This mobile device may also be used to present the token for authentication, perhaps by transmitting it electronically, or by displaying a bar code image on its display screen (e.g., a personal digital assistant (PDA) or cellular phone display).

The method 511 may go to include, at block 535, storing the information in an authentication database. For security reasons, the authentication database may be linked to, but physically separate from, a database of accounts including a financial account associated with the individual whose identity is being authenticated.

At this point, the method 511 may include providing to the requesting party a portion of a profile associated with the individual, which the individual previously authorized the financial entity to share (e.g., name, physical address, social security number, email address, telephone number, etc.).

In some embodiments, the method 511 includes generating one or more tokens by a financial entity (or any other authentication entity) upon request by the individual at block 541. Generating tokens at block 541 may include generating tokens having: one or more of an expiration time period after which presentation of the token by the customer is ineffective, a selected number of requesting parties to which the token may be presented, a selected number of times the token may be presented, and named requesting parties to whom the token may be presented. Other limitations may be imposed.

The method 511 may go on to block 545 with transmitting the token to the individual. Transmitting may comprise sending an email message, perhaps including the token, to the individual.

In some embodiments, the method 511 may include receiving funds from a customer, such as an amount associated with a transaction, or some other amount, at block 549. Thus, for example, the method 511 may include establishing a new account at a bank associated with an authenticated individual to hold the funds without receiving any further information from the customer at block 551. That is, a new account may be opened at a financial entity that is not the authenticating entity, solely on the basis of authenticating the identity of an individual using a token. Another example includes receiving an amount associated with a transaction associated with a vendor at block 549, and substantially simultaneously extending credit at block 555 to the customer by the authenticating entity (e.g., a financial entity), on behalf of the vendor, based on authenticating the identity of a particular individual, using the token.

Figure 6:
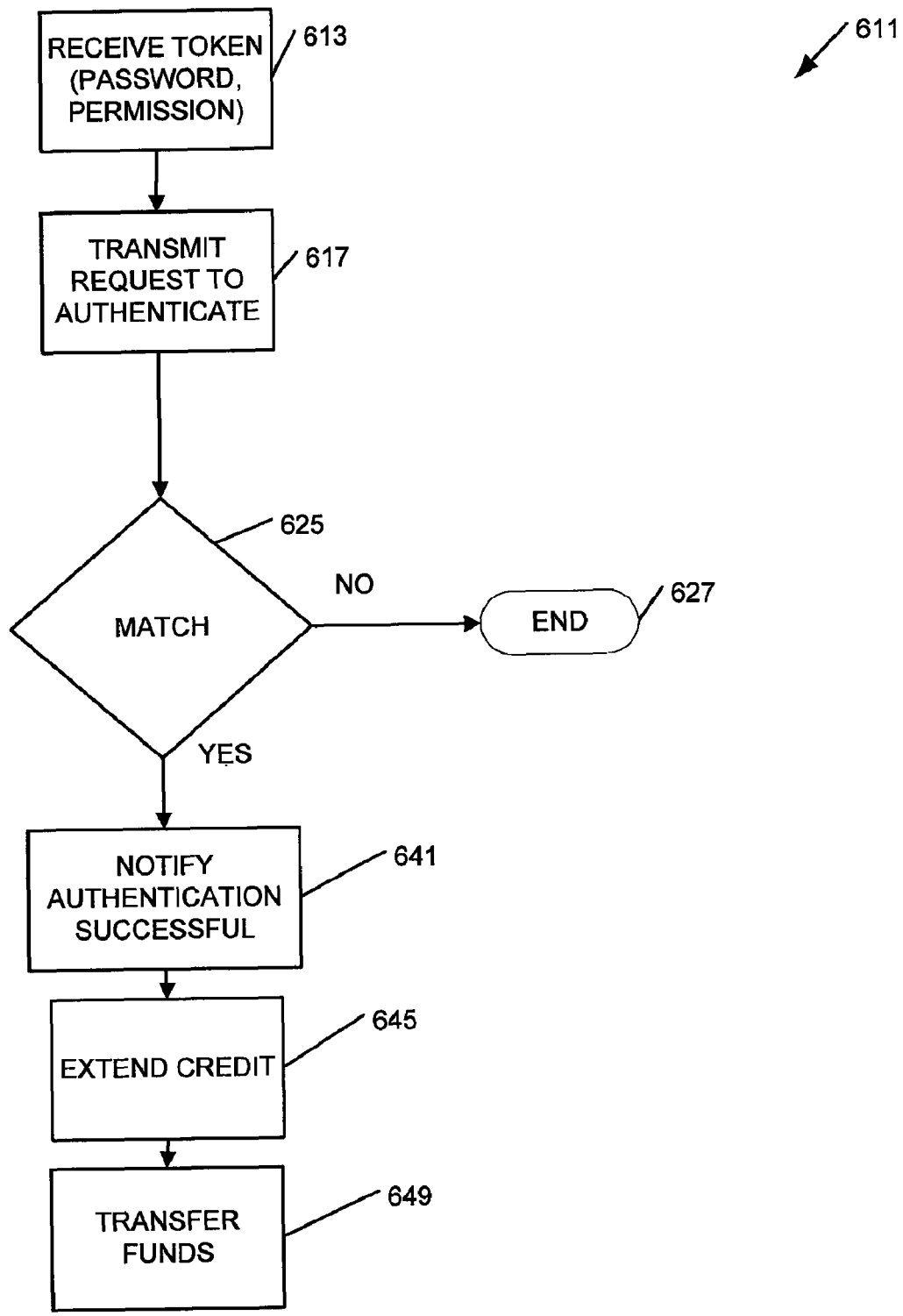
FIG. 6 is a flow diagram illustrating additional methods according to various embodiments of the invention.

FIG. 6 is a flow diagram illustrating additional methods 611 according to various embodiments of the invention. In some embodiments, a computer-implemented method 611 may begin at block 613 with receiving a token presented by a customer, which may in turn comprise receiving a password entry at a terminal, for example. At substantially the same time the token is received, permission to share selected information from the profile associated with the customer may also be received. Such permission may be entered by the customer into the same terminal as that used to receive the token. Thus, receiving at block 613 may include receiving the token in conjunction with permission to receive additional information associated with the individual. In this way, the customer has the option, in some embodiments, of permitting additional information to be shared with the vendor, even after a token is generated. Such additional information might include one or more of the name of an authenticated individual, the birth date of the individual, the physical address associated with the individual, and an identification number associated with the individual (e.g., driver's license or other license number associated with the individual).

The method 611 may go on to include transmitting a request to an authenticating entity, such as a financial entity, to authenticate the customer purporting to be a particular individual at block 617. At this point, an attempt is made to match the token to the identity registered for the individual at the authenticating entity.

If a match between the token and the identity is not obtained at block 625, then the method 611 may terminate at block 627. Of course, repeated attempts to authenticate may also occur, as shown in FIG. 5.

If the token is found to match the identity at block 625, then the method 611 may include receiving notification from the financial entity (or other authenticating entity) at block 641, that the customer is authenticated as the individual based on matching the token to an identity that has been registered with the financial entity and is uniquely associated with the individual.

In some embodiments, if the requesting party is a vendor, for example, the method 611 may include substantially simultaneously extending credit to the customer by the vendor, responsive to the authenticating, at block 645. In some embodiments, the method 611 may include automatically transferring an amount to be paid from an account associated with the individual and held by the financial entity (e.g., credit card account at the authenticating entity) directly to an account associated with the requesting party. This is what might occur when purchases are made online or in a store, for example.

The methods 511, 611 described herein do not have to be executed in the order described, or in any particular order. Moreover, various activities described with respect to the methods identified herein can be executed in repetitive, serial, or parallel fashion. Information, including parameters, commands, operands, and other data, can be sent and received in the form of one or more carrier waves.

One of ordinary skill in the art will understand the manner in which a software program can be launched from a computer-readable medium in a computer-based system to execute the functions defined in the software program. Various programming languages may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using a number of mechanisms well known to those skilled in the art, such as application program interfaces or interprocess communication techniques, including remote procedure calls. The teachings of various embodiments are not limited to any particular programming language or environment.

Thus, other embodiments may be realized, including a machine-readable medium (e.g., the memories 434 of FIG. 4) encoded with instructions for directing a machine to perform operations comprising any of the methods described herein. For example, some embodiments may include a machine-readable medium encoded with instructions for directing a client terminal or server to perform a variety of operations. Such operations may include any of the activities presented in conjunction with the methods 511, 611 described above.

Example Network Architecture

Figure 7:
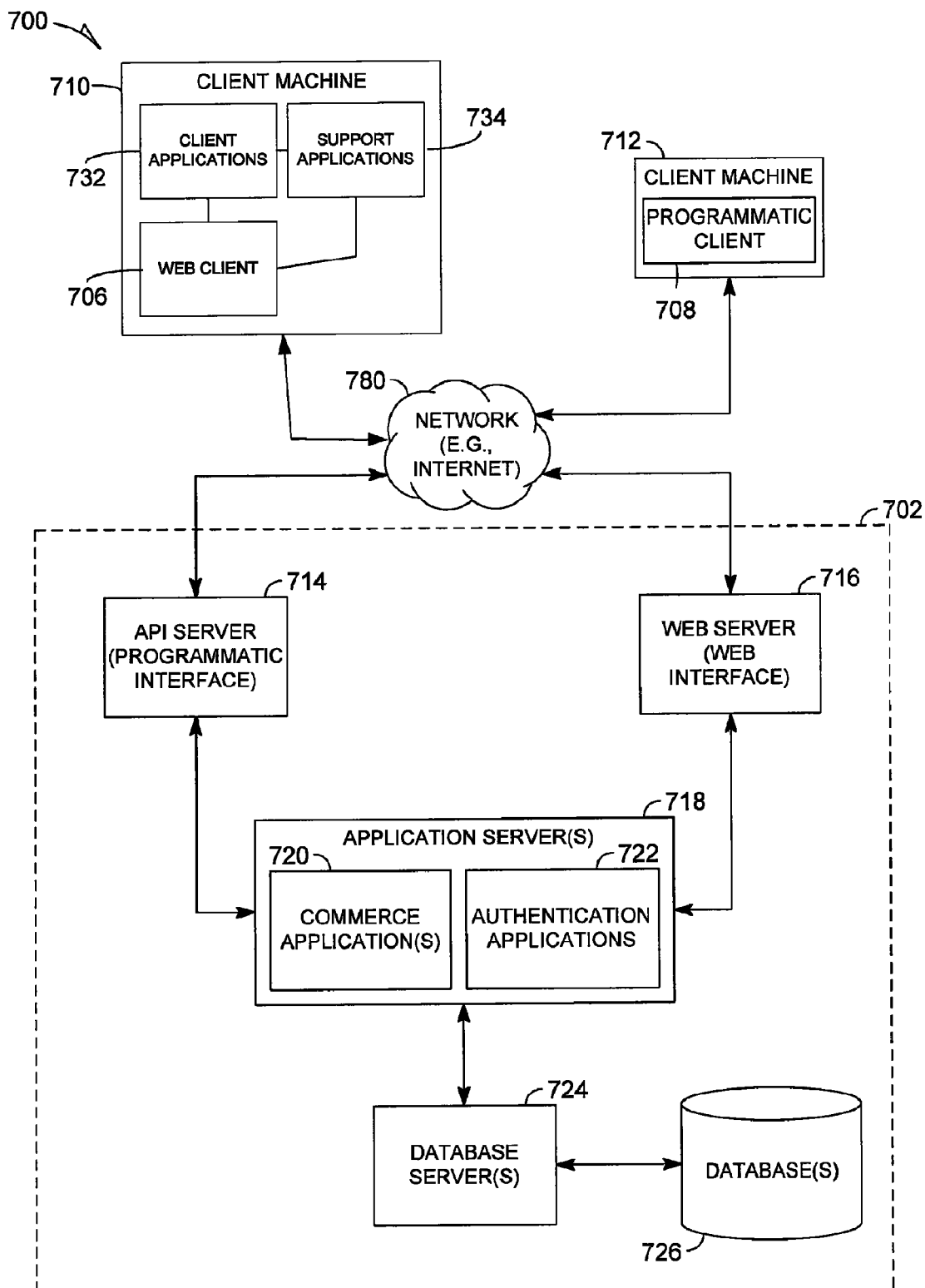
FIG. 7 is a block diagram illustrating a client-server architecture to facilitate authentication according to various embodiments of the invention.

FIG. 7 is a block diagram illustrating a client-server architecture to facilitate authentication according to various embodiments of the invention. The authentication system 700 comprises a client-server architecture used for registration, token generation and/or authentication. A financial platform, in the example form of a network-based financial system 702, provides server-side functionality, via a network 780 (e.g., the Internet) to one or more clients. FIG. 7 illustrates, for example, a web client 706 (e.g., a browser, such as the Internet Explorer browser developed by Microsoft Corporation of Redmond, Wash.), and a programmatic client 708 executing on respective client machines 710 and 712. In an example embodiment, either or both of the web client 706 and programmatic client 708 may include a mobile device.

Turning specifically to the network-based financial system 702, an Application Program Interface (API) server 714 and a web server 716 are coupled to, and provide programmatic and web interfaces respectively to, one or more application servers 718. The application servers 718 host one or more financial applications 720 and authentication applications 722 (e.g., similar to or identical to the authentication module 438 of FIG. 8). The application servers 718 are, in turn, shown to be coupled to one or more database servers 724 that facilitate access to one or more databases 726, such as registries that include links between individuals, their identity information, and/or financial entity accounts.

The financial applications 720 provide a number of financial functions and services to users that access the network-based financial system 702. The authentication applications 722 facilitate authenticating tokens presented by registered individuals.

Further, while the authentication system 700 shown in FIG. 7 employs a client-server architecture, the present application is of course not limited to such an architecture, and could equally well find application in a distributed, or peer-to-peer, architecture system. The various financial and authentication applications 720 and 722 may also be implemented as standalone software programs, which do not necessarily have networking capabilities.

The web client 706, it will be appreciated, may access the various financial and authentication applications 720 and 722 via the web interface supported by the web server 716. Similarly, the programmatic client 708 accesses the various services and functions provided by the financial and authentication applications 720 and 722 via the programmatic interface provided by the API server 714. The programmatic client 708 may, for example, comprise an authentication request module (e.g., similar to or identical to the authentication request module 428 of FIG. 4) to enable a user to request authentication and to perform batch-mode communications between the programmatic client 708 and the network-based financial system 702. Client applications 732 and support applications 734 may perform similar or identical functions.

Thus, the authentication system 700 may provide a number of registration, token generation, and authentication mechanisms whereby a user may receive tokens for authentication by any number of entities. The financial applications 720 may include one or more account management applications which support and provide services related to various user accounts in a financial entity (e.g. a bank). The various account management applications may also provide a number of features such as supervising account transfers, holding account balances, and keeping tracking of and reporting transactions to relevant applications.

The financial applications 720 may also include dispute resolution applications to provide mechanisms whereby disputes arising between transacting parties may be resolved. For example, the dispute resolution applications may provide guided procedures whereby the parties are guided through a number of steps in an attempt to settle a dispute. In the event that the dispute cannot be settled via the guided procedures, the dispute may be escalated to a customer service agent for the financial system 702, third party mediator, or arbitrator.

Example Machine Architecture

Figure 8:
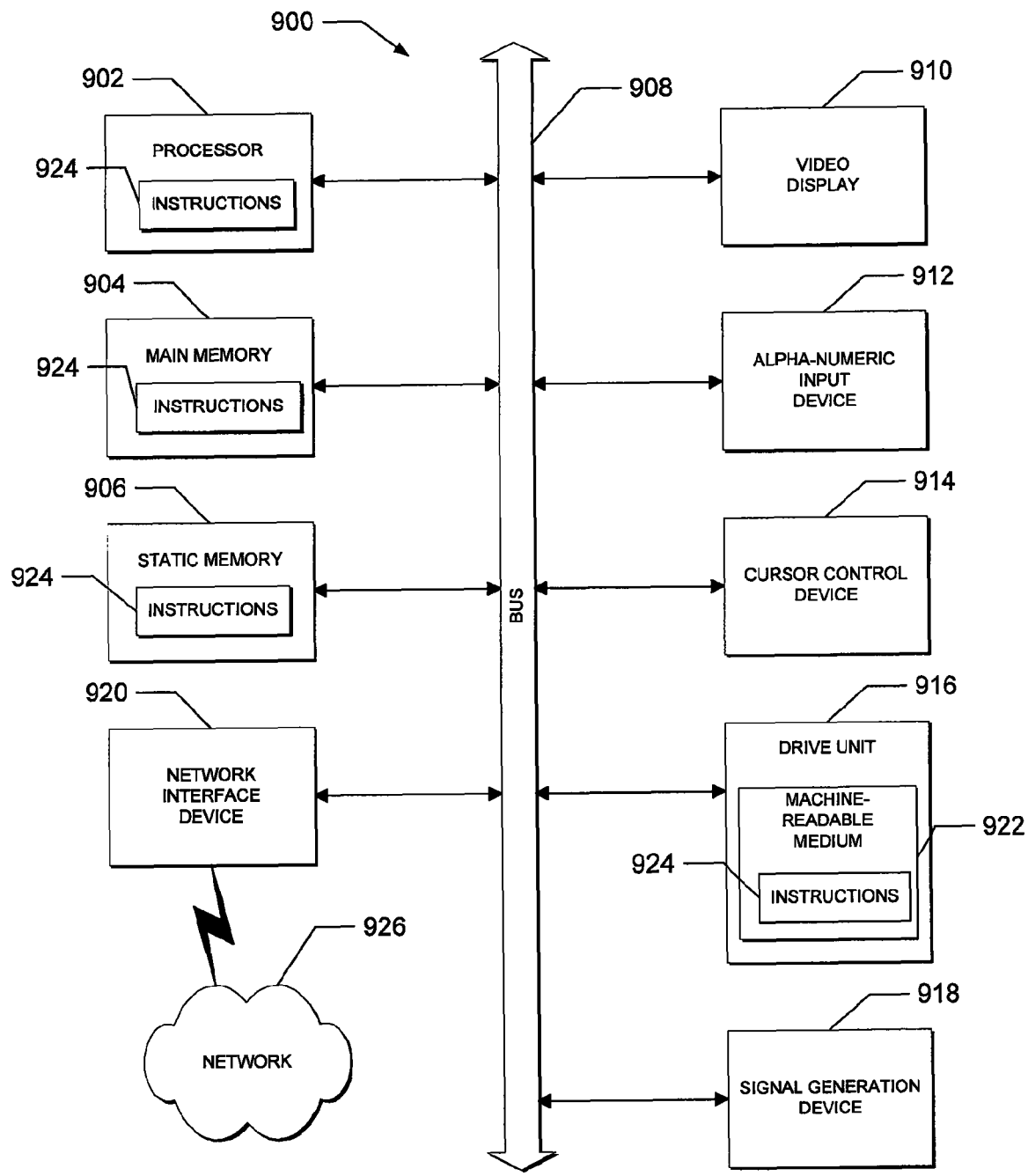
FIG. 8 is a block diagram of a machine in the example form of a computer system according to various embodiments of the invention.

FIG. 8 is a block diagram, illustrating a diagrammatic representation of machine 900 in the example form of a computer system within which a set of instructions for causing the machine to perform any one or more of the methodologies discussed herein may be executed. The machine 900 may also be similar to or identical to the client terminal 402 or server 430 of FIG. 4.

In alternative embodiments, the machine 900 may operate as a standalone device or may be connected (e.g., networked) to other machines. In a networked deployment, the machine 900 may operate in the capacity of a server or a client machine in a server-client network environment, or as a peer machine in a peer-to-peer (or distributed) network environment.

The machine 900 may be a server computer, a client computer, a personal computer (PC), a tablet PC, a set-top box (STB), a PDA, a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 may include a processor 902 (e.g., a central processing unit (CPU), a graphics processing unit (GPU) or both), a main memory 904 and a static memory 906, all of which communicate with each other via a bus 908. The computer system 900 may further include a video display unit 910 (e.g., liquid crystal displays (LCD) or cathode ray tube (CRT)). The computer system 900 also may include an alphanumeric input device 912 (e.g., a keyboard), a cursor control device 914 (e.g., a mouse), a disk drive unit 916, a signal generation device 918 (e.g., a speaker) and a network interface device 920.

The disk drive unit 916 may include a machine-readable medium 922 on which is stored one or more sets of instructions (e.g., software 924) embodying any one or more of the methodologies or functions described herein. The software 924 may also reside, completely or at least partially, within the main memory 904 and/or within the processor 902 during execution thereof by the computer system 900, the main memory 904 and the processor 902 also constituting machine-readable media. The software 924 may further be transmitted or received over a network 926 via the network interface device 920, which may comprise a wired and/or wireless interface device.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include tangible media that include, but are not limited to, solid-state memories and optical and magnetic media.

The machine 900 may use various hardware accelerators and security systems as part of the instructions 924 for performing ciphering and cryptography, including the Rivest-Shamir-Adleman (RSA) security algorithm and cryptography by RSA Security, Inc. located at Bedford, Mass., as well as the El Gamal algorithm by Taher El Gamal. The RSA implementation is also to implement RSA BSAFE implementation, which is a form of hardware accelerator, to support the BSAFE library interface. Alternative solutions include operating system platforms (e.g., OpenBSD) that are securely built into an operating system. The operating system platforms can dedicate a processor in a multiple-way hardware platform and are also configured to use one or more processors in a multi-processor system for cryptographic operations. The machine 900 may further use decryption and encryption in validating a token's sequence number to prevent other systems or sites from replaying or minting the token authentication module (see module 438 of FIG. 4).

Using the apparatus, systems, and methods disclosed herein may reduce the effort required to verify the identity of individuals at a number of entities, including stores, banks, online auctions, and the like. Increased customer satisfaction may result.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method, comprising:
   registering one time, at a server associated with a financial entity, information comprising an identity uniquely associated with an individual having a financial account held by the financial entity, wherein the registering includes receiving, from a user input device associated with the individual, a user permission authorizing the financial entity to share a selected portion of the information with a plurality of selected requesting parties;
   receiving a request at the server associated with the financial entity from a requesting party to authenticate a customer purporting to be the individual, responsive to a transaction request being provided by the customer to the requesting party;
   authenticating, by the server associated with the financial entity, the customer as the individual by matching a token presented by the customer to the identity uniquely associated with the individual; and
   responsive solely to the authenticating, providing from the server associated with the financial entity to the requesting party only the selected portion of the information previously authorized by the individual to be shared with the plurality of selected requesting parties.

2. The computer-implemented method of claim 1, wherein the registering comprises obtaining, verifying, and recording the information according to at least one of customer identification program (CIP) requirements, Know Your Customer (KYC) requirements, Know Your Business (KYB) requirements, or watch-list scanning requirements, wherein the information comprises at least one of a name of the individual, a birth date of the individual, a physical address associated with the individual, or an identification number associated with the individual.

3. The computer-implemented method of claim 1, wherein the registering comprises obtaining, verifying, and recording a prior verification associated with the customer by the financial entity against at least one of customer identification program (CIP) requirements, Know Your Customer (KYC) requirements, Know Your Business (KYB) requirements, or watch-list scanning requirements.

4. The computer implemented method of claim 1, wherein the registering comprises:
   generating the token for the individual by the server of the financial entity upon request by the individual; and
   transmitting the token to the individual.

5. The computer implemented method of claim 4, wherein the generating the token comprises receiving from the user input device at least one of an expiration time period after which presentation of the token by the customer is ineffective, a selected number of requesting parties to which the token may be presented, or a selected number of times the token may be presented to the selected number of requesting parties.

6. The computer implemented method of claim 4, wherein the transmitting comprises sending an email message including the token to the individual.

7. The computer implemented method of claim 1, wherein the requesting party comprises one of a vendor and another financial entity.

8. The computer implemented method of claim 1, wherein the requesting party comprises a bank, further comprising:
   receiving funds from the customer; and
   establishing an account at the bank associated with the individual to hold the funds without receiving any further information from the customer.

9. The computer implemented method of claim 1, wherein the requesting party comprises a vendor, further comprising:
   receiving an amount associated with a transaction associated with the vendor; and
   substantially simultaneously extending credit to the customer by the financial entity, on behalf of the vendor, based on the authenticating.

10. The computer implemented method of claim 1, wherein the receiving the request comprises receiving a message from the requesting party at the financial entity via a global computer network.

11. The computer implemented method of claim 1, further comprising notifying the requesting party that the customer has been authenticated as the individual by sending a message to the requesting party via a global computer network.

12. A computer-implemented method, comprising:
   receiving a request at a server associated with a financial entity from a requesting party responsive to a transaction request being provided to the requesting party by a customer purporting to be an individual previously authenticated with the financial entity, the request to authenticate the customer, the receiving the request including receiving, at the server associated with the financial entity, a token from a user input device associated with the customer, the token including information associated with the customer and a user permission authorizing the financial entity to share a selected portion of the information with a plurality of selected requesting parties, the user permission configured to be received during registration of the information comprising an identity to the server associated with the financial entity;
   authenticating, by the server associated with the financial entity, the customer as the individual based on matching the token to the identity that has been registered with the financial entity and is uniquely associated with the individual; and
   responsive solely to the authenticating, providing from the server associated with the financial entity to the requesting party only the selected portion of the information previously authorized by the individual to be shared with the plurality of selected requesting parties.

13. The computer-implemented method of claim 12, wherein the token comprises a password.

14. The computer-implemented method of claim 12, wherein the financial entity comprises a bank.

15. The computer-implemented method of claim 12, wherein the requesting party comprises a vendor, further comprising substantially simultaneously extending credit to the customer by the vendor, responsive to the authenticating.

16. The computer-implemented method of claim 12, further comprising automatically transferring an amount to be paid from an account associated with the individual and held by the financial entity directly to an account associated with the requesting party.

17. The computer-implemented method of claim 12, wherein each of the plurality of selected requesting parties comprises a vendor.

18. The computer-implemented method of claim 12, wherein the token associated with the individual includes information indicating the plurality of selected requesting parties.

19. The computer-implemented method of claim 12, wherein the receiving the request comprises:
   receiving from the user input device an additional permission authorizing the financial entity to share an additional portion of the information with one or more of the plurality of the selected requesting parties.

20. The computer-implemented method of claim 12, wherein the authenticating comprises:
   comparing a first name of the requesting party with a second name of a corresponding one of the plurality of selected requesting parties until the matching is identified.

21. The computer-implemented method of claim 12, further comprising:
   refraining from providing the selected portion of the information to the requesting party based on a determination that the requesting party does not match any of the plurality of selected requesting parties.

22. The computer-implemented method of claim 12, further comprising:
   automatically opening a new financial account of the customer at another financial entity responsive to the authenticating.

23. The computer-implemented method of claim 12, further comprising:
   automatically extending credit to the customer by the requesting party responsive to the authenticating.

24. An apparatus, comprising:
   a client module to communicatively couple to a server associated with a financial entity; and
   at least one processor to run an authentication request module configured to receive a token presented for a transaction request from a user input device associated with a customer, to transmit a request to the financial entity to authenticate the customer purporting to be an individual, to receive notification, from the financial entity, that the customer is authenticated as the individual based on matching the token to an identity that has been registered with the financial entity and is uniquely associated with the individual and to receive, from the server associated with the financial entity, only a selected portion of information associated with the customer responsive solely to the customer being authenticated for the transaction request as the individual by the financial entity, wherein the selected portion of the information is previously authorized by the customer to be shared between the financial entity and a plurality of selected requesting parties, during registration of the identity to the server associated with the financial entity.

25. The apparatus of claim 24, wherein the user input device comprises at least one of a keypad, a thumbwheel, a touch screen, a button, or a voice recognition processor.

26. The apparatus of claim 24, further comprising a point of sale terminal to house the user input device.

27. A system, comprising:
a server to communicatively couple to a global computer network; and
an authentication module to register an individual, the registering including receiving information associated with the individual and receiving a user permission authorizing a financial entity associated with the server to share a selected portion of the information with a plurality of selected requesting parties, to receive a request from a requesting party, the request including a token presented by a customer, to authenticate the customer purporting to be the individual responsive to a transaction request being provided by the customer to the requesting party, and to send notification that the customer is authenticated as the individual based on matching the token to an identity that has been registered with the financial entity and is uniquely associated with the individual, the authentication module configured, responsive solely to the customer being authenticated for the transaction request as the individual by the financial entity, to provide from the server to the requesting party only the selected portion of the information previously authorized by the individual to be shared with the plurality of selected requesting parties.

28. The system of claim 27, further comprising a point of sale terminal associated with the requesting party, wherein the point of sale terminal is to receive the token, and to be communicatively coupled to the server.

29. The system of claim 27, further comprising a storage device to couple to the server and to store a database having a plurality of registered identities, including the identity.

30. A machine-readable device storing instructions, which when executed by one or more processors, cause the one or more processors to perform operations comprising:
registering one time, at a server associated with a financial entity, information comprising an identity uniquely associated with an individual having a financial account held by the financial entity, wherein the registering includes receiving, from a user input device associated with the individual, a user permission authorizing the financial entity to share a selected portion of the information with a plurality of selected requesting parties;
receiving a request at the server associated with the financial entity from a requesting party, the request to authenticate a customer purporting to be the individual responsive to a transaction request being provided by the customer to the requesting party;
authenticating, by the server associated with the financial entity, the customer as the individual by matching a token presented by the customer to the identity uniquely associated with the individual; and
responsive solely to the authenticating, providing from the server associated with the financial entity to the requesting party only the selected portion of the information previously authorized by the individual to be shared with the plurality of selected requesting parties.

31. The machine-readable device of claim 30, wherein the instructions, when executed by the one or more processors, cause the one or more processors to further perform storing the information in an authentication database, linked to but physically separate from, a database of accounts including the financial account.

32. The machine-readable device of claim 31, wherein the instructions, when executed by the one or more processors, cause the one or more processors to further perform sending a message to a mobile device associated with the customer that the authenticating has been successful.

33. The machine-readable device of claim 32, wherein the additional information comprises at least one of a name of the individual, a birth date of the individual, a physical address associated with the individual, or an identification number associated with the individual.

34. The machine-readable device of claim 32, wherein the instructions, when executed by the one or more processors, cause the one or more processors to further perform requesting, if the authenticating is not successful, additional information from the customer.

* * * * *

UNITED STATES PATENT AND TRADEMARK OFFICE
CERTIFICATE OF CORRECTION

| | | |
|---|---|---|
| PATENT NO. | : 8,214,291 B2 | Page 1 of 2 |
| APPLICATION NO. | : 11/962757 | |
| DATED | : July 3, 2012 | |
| INVENTOR(S) | : Pelegero et al. | |

It is certified that error appears in the above-identified patent and that said Letters Patent is hereby corrected as shown below:

On the face page 1, under "Other Publications", in column 2, line 1, before "U.S.", insert --"--, therefor On the face page 1, under "Other Publications", in column 2, line 2, after "2009", insert --"--, therefor On the face page 2, under "Other Publications", in column 1, line 9, before "U.S.", insert --"--, therefor On the face page 2, under "Other Publications", in column 1, line 10, after "2009", insert --"--, therefor On the face page 2, under "Other Publications", in column 1, line 11, before "International", insert --"--, therefor On the face page 2, under "Other Publications", in column 1, line 12, after "2010", insert --"--, therefor On the face page 2, under "Other Publications", in column 2, line 1, before "International", insert --"--, therefor On the face page 2, under "Other Publications", in column 2, line 2, after "2010", insert --"--, therefor On the face page 2, under "Other Publications", in column 2, line 7, delete "Filed", and insert --filed--, therefor In column 1, line 9, after "eBay", delete "," and insert --.--, therefor In column 1, line 25, delete "Websites" and insert --websites--, therefor In column 2, line 11, after "need", insert --to--, therefor In column 4, line 58, after "registered", delete "identities", therefor In column 6, line 14, after "individual", insert --,--, therefor In column 6, line 47, delete "Security, Inc." and insert --Security Inc.,--, therefor In column 11, line 62, in Claim 12, before "receiving", delete "the", therefor Signed and Sealed this
Eleventh Day of September, 2012

David J. Kappos
*Director of the United States Patent and Trademark Office*

CERTIFICATE OF CORRECTION (continued)
U.S. Pat. No. 8,214,291 B2

In column 12, line 12, in Claim 12, after "party", insert --,--, therefor

In column 12, line 36, in Claim 19, before "receiving", delete "the", therefor

In column 13, line 36, in Claim 27, after "individual", insert --,--, therefor

In column 13, line 43, in Claim 27, after "party", insert --,--, therefor

In column 14, line 26, in Claim 30, after "party", insert --,--, therefor

In column 14, line 35, in Claim 32, delete "31" and insert --30--, therefor